Oct. 18, 1955       R. M. SIBLEY       2,720,788
CONTINUOUS VAPOR SAMPLER
Filed May 28, 1952

INVENTOR
RICHARD M. SIBLEY

BY *Edwin J. Middleton*

ATTORNEY

United States Patent Office 2,720,788
Patented Oct. 18, 1955

2,720,788

CONTINUOUS VAPOR SAMPLER

Richard M. Sibley, New York, N. Y., assignor to American Cyanamid Company, New York, N. Y., a corporation of Maine Application May 28, 1952, Serial No. 290,401

1 Claim. (Cl. 73—422)

This invention relates to apparatus for removing samples from streams of vapors flowing in a vapor duct. More particularly it relates to apparatus for removing samples continuously or intermittently without disturbing whatever conditions exist in the flowing stream of vapors.

It is an important object of this invention to provide means for withdrawing samples from a stream of vapors in order that a representative sample may be obtained over a long period of time.

It is another object of this invention to provide apparatus by means of which samples may be withdrawn from a system without disturbing either the pressure or flow of vapor in that system.

It is another object of this invention to provide apparatus for the detection of solids loss or vapor contaminants.

Briefly, the invention comprises a separating chamber connected to a vapor duct by means of an inlet tube. The vapor duct contains the flowing stream of vapors to be sampled. The inlet tube is provided with a cooling jacket that condenses any vapors passing through the inlet tube. The separating chamber is provided with means for creating a pressure differential between the separating chamber and the vapor duct. This pressure differential serves to draw a portion of the vapors from the vapor duct into the inlet tube where the vapors condense into a liquid. The liquid then drips into the separating chamber. The separating chamber is provided with an outlet so that the condensed vapors may be withdrawn.

The advantages of the invention will be apparent from the following detailed explanation taken in conjunction with the accompanying drawings. A preferred embodiment of the principles of the invention has been selected for illustration.

Figure 1:
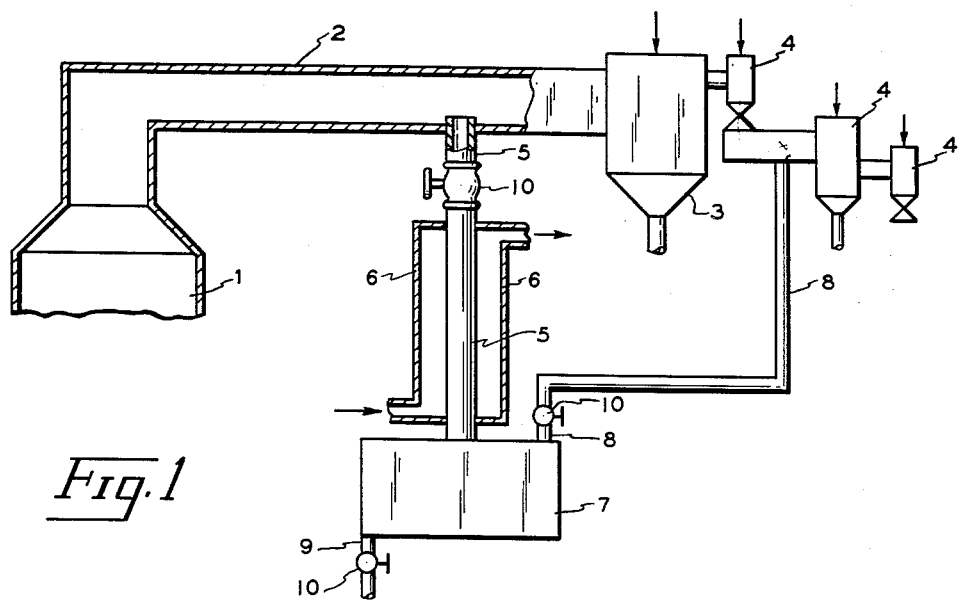
Fig. 1 is a vertical cross sectional view of the sampling device inserted into an evaporating system.

Referring in greater detail to the drawings the vapors in any evaporating system rise to the header 1 and pass through the vapor duct 2 on their way to the barometric condenser 3. Steam jets 4 or other similar means supply the necessary vacuum. An inlet tube 5 protrudes into the vapor duct 2. The jacket 6 surrounds the inlet tube 5 and extends along the length of inlet tube 5 for any desired distance. A separating chamber 7 depends from the bottom of the inlet tube 5. The vent 8 leads off from the separating chamber and connects to any convenient source of vacuum or to the atmosphere. The separating chamber is also provided with an outlet 9 for removing condensed vapors therefrom.

The inlet tube 5 may protrude into the vapor duct 2 for any desired distance. It is usually desirable not to have the inlet tube 5 remain flush with the bottom of the vapor duct 2 since this may lead to the obtaining of a non-representative sample due to any condensate running along the bottom of the vapor duct 2. The jacket 6 may contain any desired coolant such as water or brine. However, if a high melting material is being evaporated in the evaporator system then the jacket 6 may carry a coolant such as steam. In this case, the coolant will flow through the jacket from top to bottom instead of from bottom to top as indicated by the arrows in the drawings.

The size of the separating chamber 7 is not critical. If small samples are to be intermittently withdrawn from the separating chamber 7 then the chamber need not be as large as it would be if a sample were allowed to accumulate in the separating chamber 7 over a prolonged period of time. Depending upon the type of material being sampled the separating chamber 7 may be insulated, or it may be jacketed in the same manner as is the inlet tube 5. A jacket for the separating chamber 7 is not shown in the drawings.

The vent 8 may connect to any desirable pressure reducing means. Where the evaporation is being conducted under superatmospheric pressure the vent 8 may merely open to the atmosphere as shown in Fig. 1A; this will produce the pressure differential needed to obtain the desired controlled flow of vapors from the vapor duct 2 through the inlet tube 5. Where the steam jets 4 supply vacuum to vapor duct 2 it may be convenient to connect the vent 8 directly to the steam jets 4 since the jets 4 supply a readily available means for obtaining a vacuum in the separating chamber 7. In this case it may be desirable to have a throttling valve of some kind installed in the line that connects the vent 8 with the jets 4.

The condensate in the separating chamber 7 flows out of the outlet 9 into a sampling hot well. If there is not enough head available for a barometric leg the condensed sample may be pumped out through outlet 9 by means well known in the art, or if the sample is withdrawn from a pressure system (i. e. greater than atmospheric) the sample may be trapped out by means well known in the art.

Figure 1A:
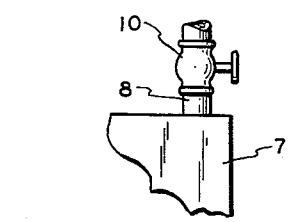
Fig. 1A is a vertical cross sectional view of a fragment of the sampling device.

Fig. 1 shows the continuous sampling device equipped with throttling valves 10. The throttling valves 10 may be installed at each of the outlet 9, the vent 8, and the top portion of the inlet tube 5. Thus the valves 10 completely control the conditions that exist inside the sampling device. The valve on the vent 8 controls the pressure that exists inside the sampling device. The valve on the inlet tube 5 controls the amount of vapors that flow into the sampling device. The valve on the outlets 9 controls the rate of removal of the condensed samples.

It has been found in practice that scale does not form in the sampling device of the present invention since the condensing film tends to wash down any scale that forms inside the inlet tube 5. However, a valve 10 installed near the upper end of the inlet tube makes it possible to remove the entire sampling device in case cleaning or other repairs should be necessary.

The sampling device of the present invention permits the continuous withdrawal of a condensed vapor sample from vapor-carrying ducts. The amount of vapor to be withdrawn as a sample may be accurately controlled and may be made as large or as small as desired. The withdrawal of the sample does not disturb the vacuum or the vapor flow in the system from which the sample is being withdrawn.

The apparatus of the present invention is useful to swiftly detect entrainment losses. This is an important consideration not only from the point of view of minimizing the loss of product but for minimizing air or water pollution. Many evaporating systems contain a barometric condenser 3. Water from this condenser is often released untreated into a flowing stream or river. Thus the apparatus of the present invention may be used to minimize water pollution. The invention has utility in vacuum stills, evaporators, driers and the like where it is desirable to obtain condensed vapor samples uncontaminated by barometric condenser water.

It is intended to cover all changes and modifications of the embodiments of this invention herein chosen for purposes of the disclosure which do not constitute departure from the spirit and scope of the invention.

I claim:

An apparatus for extracting a portion of a flowing stream of vapors as a representative sample consisting essentially of a vapor duct, a separating chamber, an inlet tube extending into said vapor duct and connecting said duct and said chamber, a cooling jacket for said inlet tube, a valve in said inlet tube between said jacket and said duct, a barometric condenser taking vapors from said duct, a steam ejector connected to said barometric condenser for reducing the pressure in said barometric condenser and removing noncondensing gases, a vapor vent line on said separating chamber and discharging into the steam ejector, a valve in said vapor vent line, and means to remove a liquid sample from said chamber.

References Cited in the file of this patent

UNITED STATES PATENTS

| | | |
|---|---|---|
| 1,364,035 | Carter, Jr. | Dec. 28, 1920 |
| 2,030,682 | Campbell | Feb. 11, 1936 |
| 2,306,606 | Hirsch | Dec. 29, 1942 |
| 2,475,857 | Reinert | July 12, 1949 |